Figure 1:
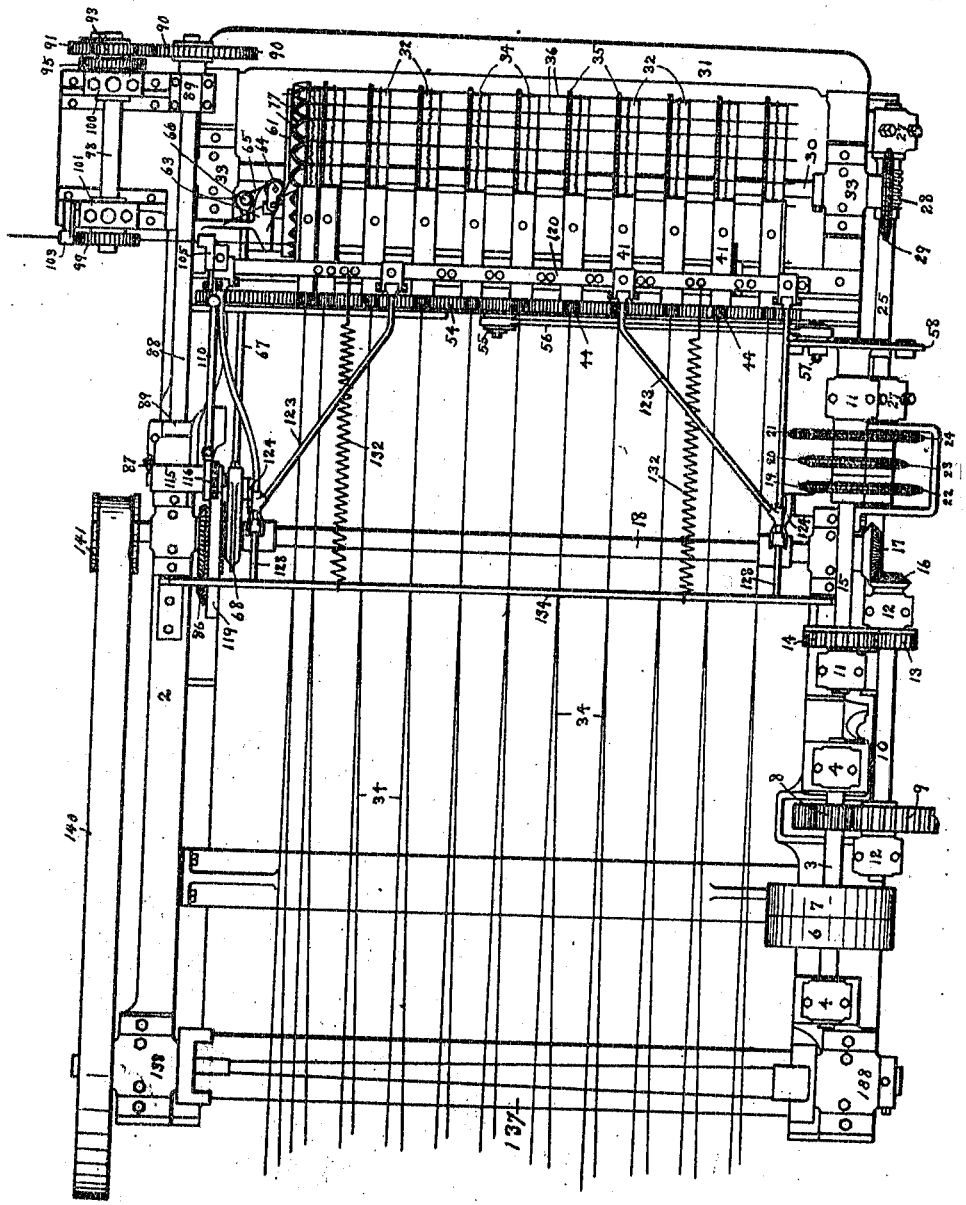

J. W. SNEDEKER.
FENCE MACHINE.
APPLICATION FILED MAY 12, 1913.

1,088,844.

Patented Mar. 3, 1914.
16 SHEETS—SHEET 1.

WITNESSES:

INVENTOR
James W. Snedeker
BY
Edward N. Pagelsen.
ATTORNEY

J. W. SNEDEKER.
FENCE MACHINE.
APPLICATION FILED MAY 12, 1913.

1,088,844.

Patented Mar. 3, 1914.
16 SHEETS—SHEET 5.

WITNESSES:
Chas. J. Fitzsimons
J. H. Perrault

INVENTOR
James W. Snedeker
BY
Edward N. Pagelsen
ATTORNEY

J. W. SNEDEKER.
FENCE MACHINE.
APPLICATION FILED MAY 12, 1913.

1,088,844.

Patented Mar. 3, 1914.
16 SHEETS—SHEET 6.

WITNESSES:
Chas. J. Fitzsimons
J H Perrault

INVENTOR
James W. Snedeker.
BY
Edward N. Pagelsen
ATTORNEY

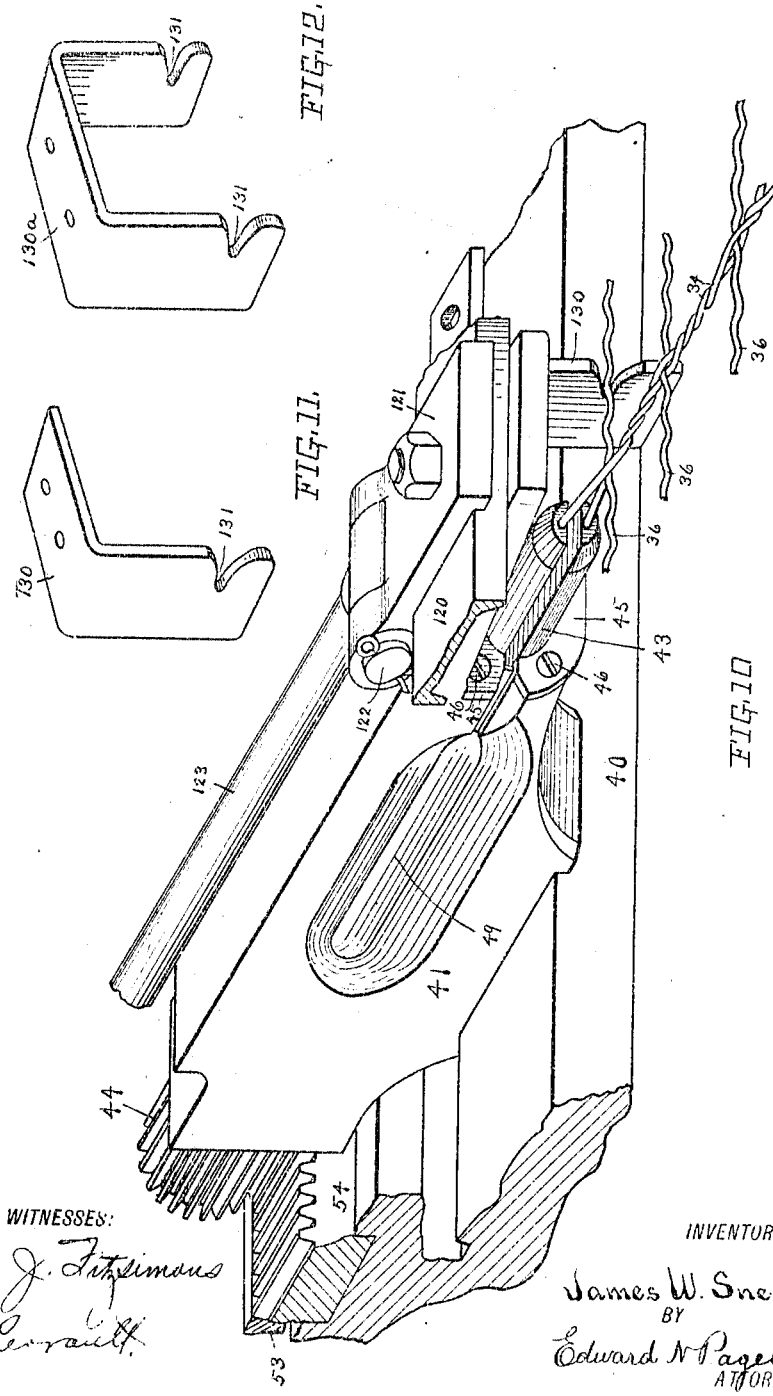

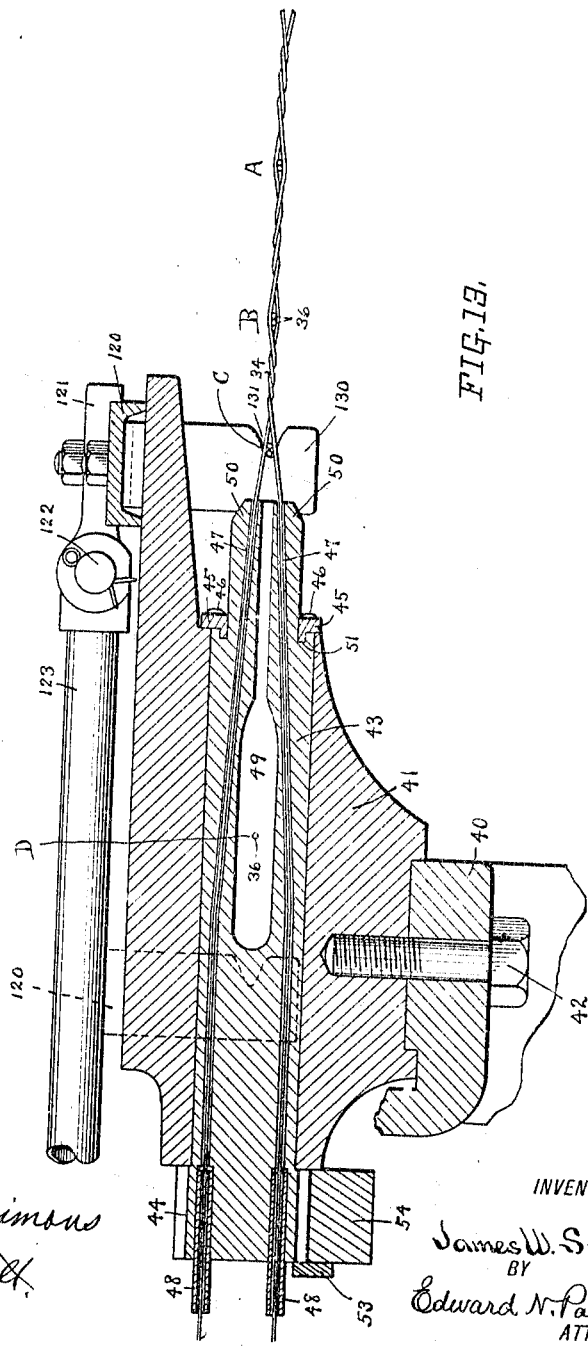

J. W. SNEDEKER.
FENCE MACHINE.
APPLICATION FILED MAY 12, 1913.

1,088,844.

Patented Mar. 3, 1914.
16 SHEETS—SHEET 10.

WITNESSES:
Chas. J. Fitzsimmons
J. H. Perrault

INVENTOR
James W. Snedeker,
BY
Edward N. Pagelsen
ATTORNEY

J. W. SNEDEKER.
FENCE MACHINE.
APPLICATION FILED MAY 12, 1913.

1,088,844.

Patented Mar. 3, 1914.
16 SHEETS—SHEET 11.

WITNESSES:

INVENTOR
James W. Snedeker
BY
Edward N. Pagelsen.
ATTORNEY

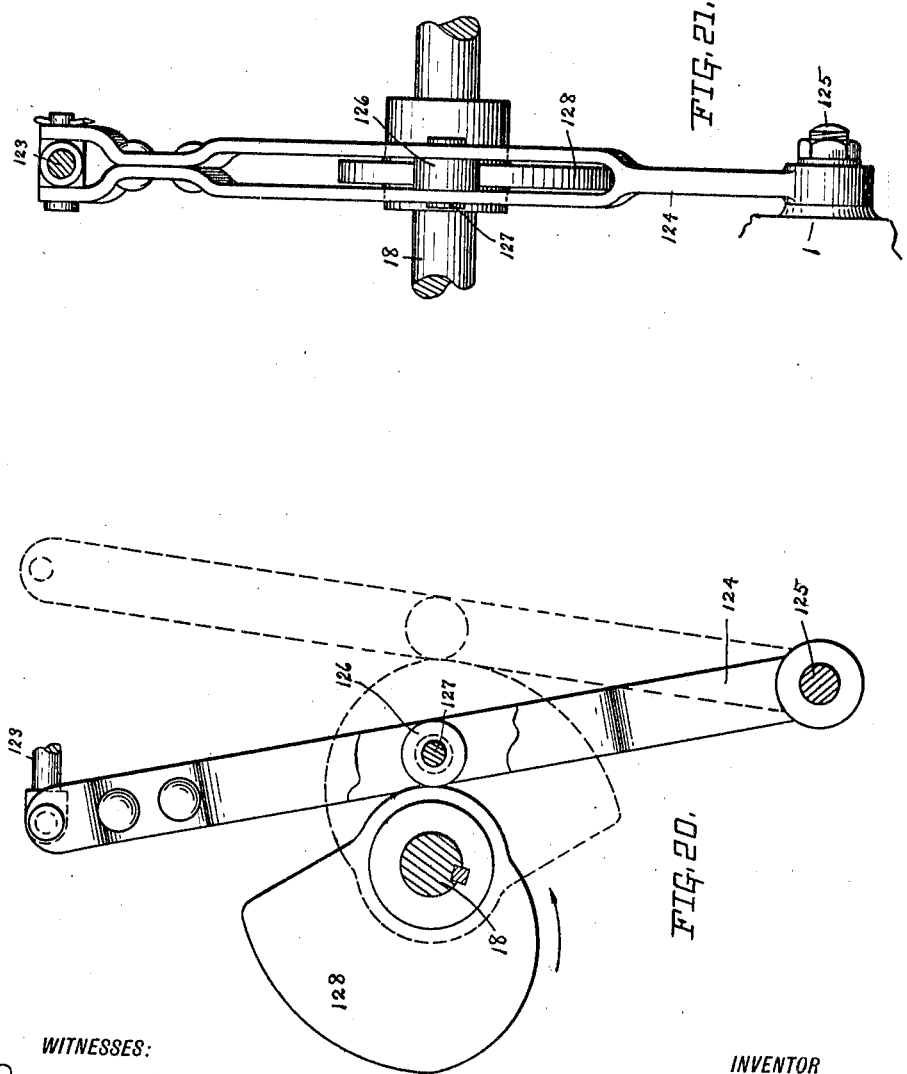

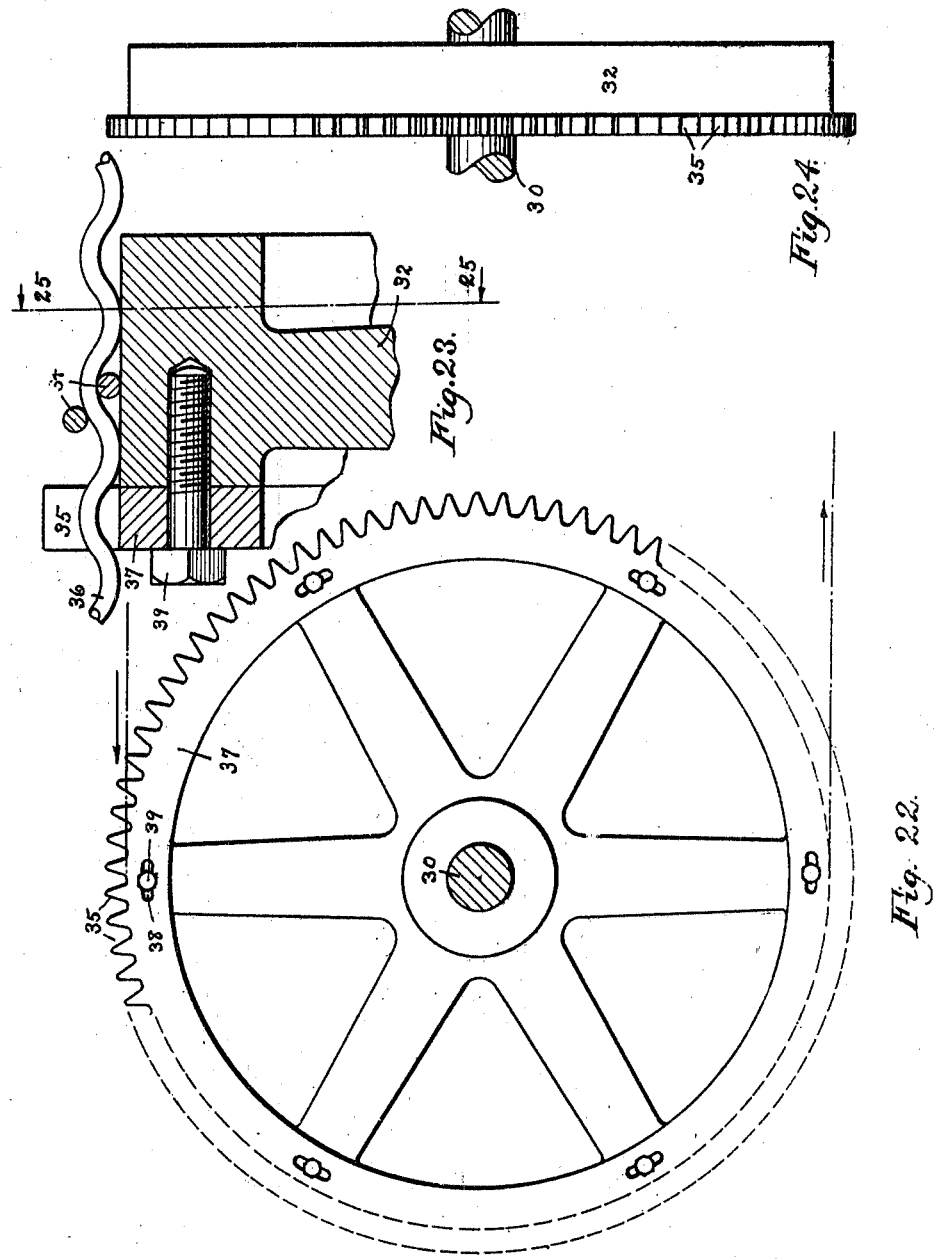

J. W. SNEDEKER.
FENCE MACHINE.
APPLICATION FILED MAY 12, 1913.

1,088,844.

Patented Mar. 3, 1914.
16 SHEETS—SHEET 14.

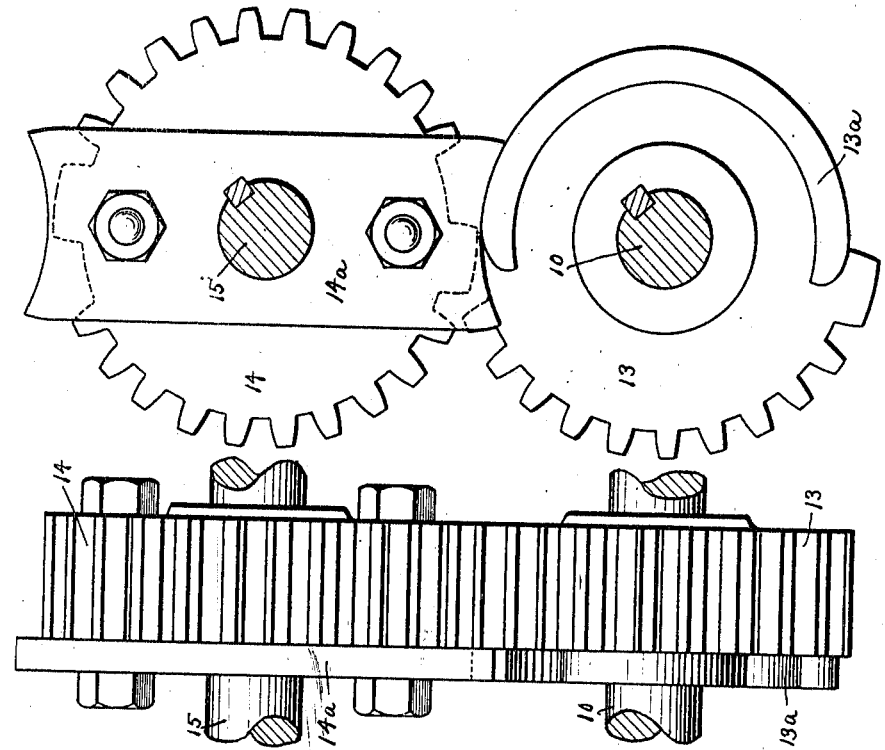
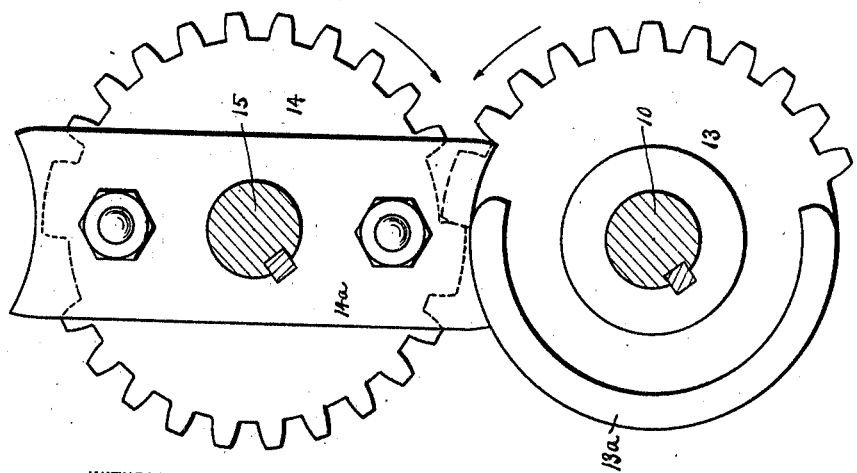

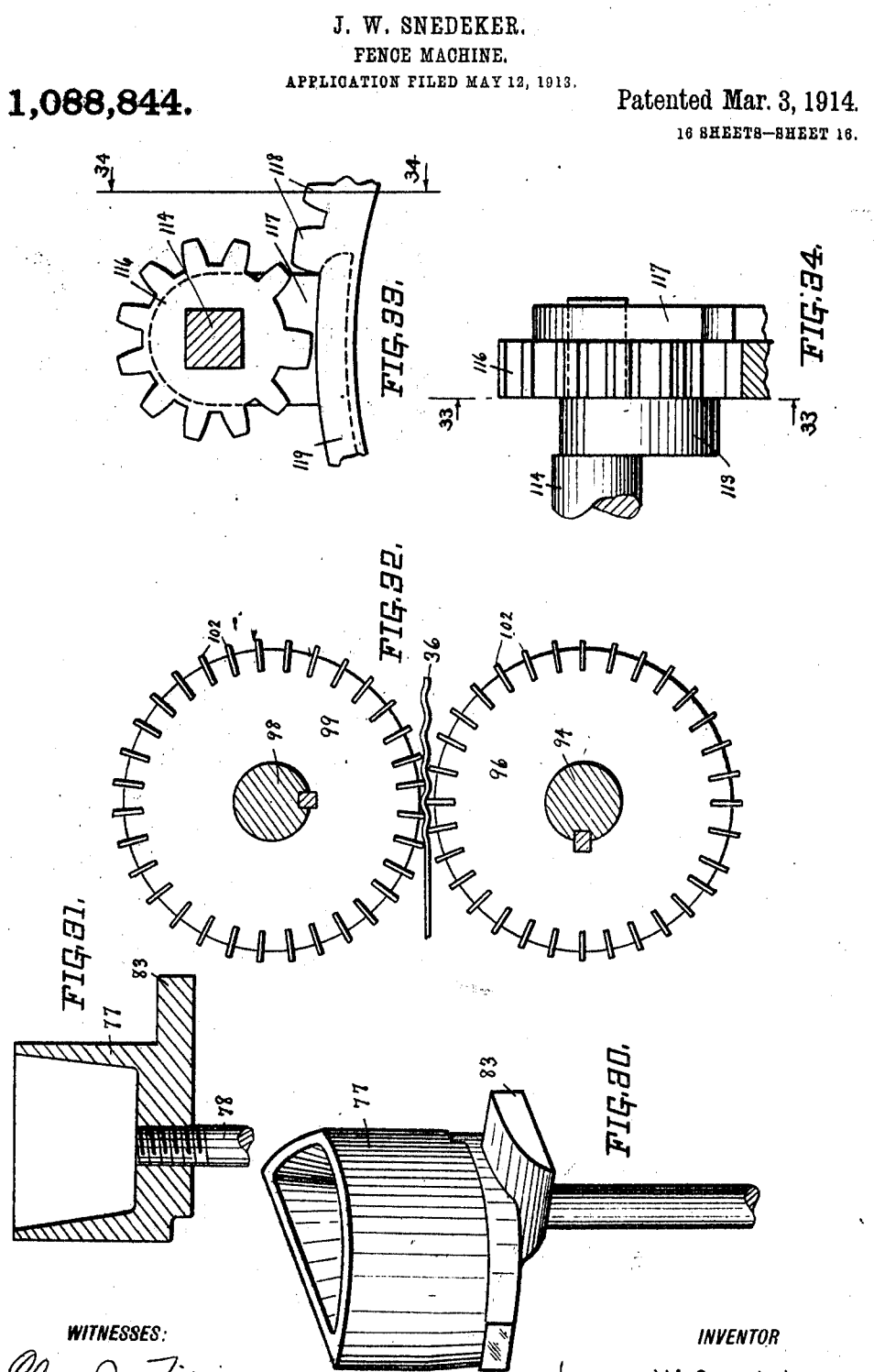

UNITED STATES PATENT OFFICE.

JAMES W. SNEDEKER, OF ADRIAN, MICHIGAN, ASSIGNOR TO PAGE WOVEN WIRE FENCE COMPANY, OF ADRIAN, MICHIGAN, A CORPORATION OF NEW JERSEY.

FENCE-MACHINE.

1,088,844.     Specification of Letters Patent.     Patented Mar. 3, 1914.

Application filed May 12, 1913. Serial No. 766,924.

*To all whom it may concern:*

Be it known that I, JAMES W. SNEDEKER, a citizen of the United States, and a resident of Adrian, in the county of Lenawee and State of Michigan, have invented a new and Improved Fence-Machine, of which the following is a specification.

This invention relates to a machine especially designed for producing ornamental fabric adapted for lawn and garden fencing, and its object is to provide simple and efficient means for rapidly and perfectly producing ornamental fencing wherein provision is made for automatically feeding the woof or picket strands into the machine at predetermined intervals, and for securing the picket strands to the longitudinal or warp strands which may be twisted together on opposite sides of the picket for woof strands alternately in opposite directions.

The invention further contemplates the forming of the picket or woof strands into arches at an edge of the fabric, the free ends of which woof strands are secured to the warp strands.

This invention consists, in the combination of a drum built up of a series of toothed wheels to receive the warp and woof wires, and of a wheel concentric with the others having substantially triangular anvils, means to move said anvils into position to receive the woof wires, means to bend the woof wires around said anvils so as to form arches, means to feed the warps to the drum and to secure the woof wires to said warp wires, and feeding means for positioning the woof wires so that they may be bent to form arches and then secured in position. It further consists in means to twist the warp wires to secure the woof wires.

Figure 2:
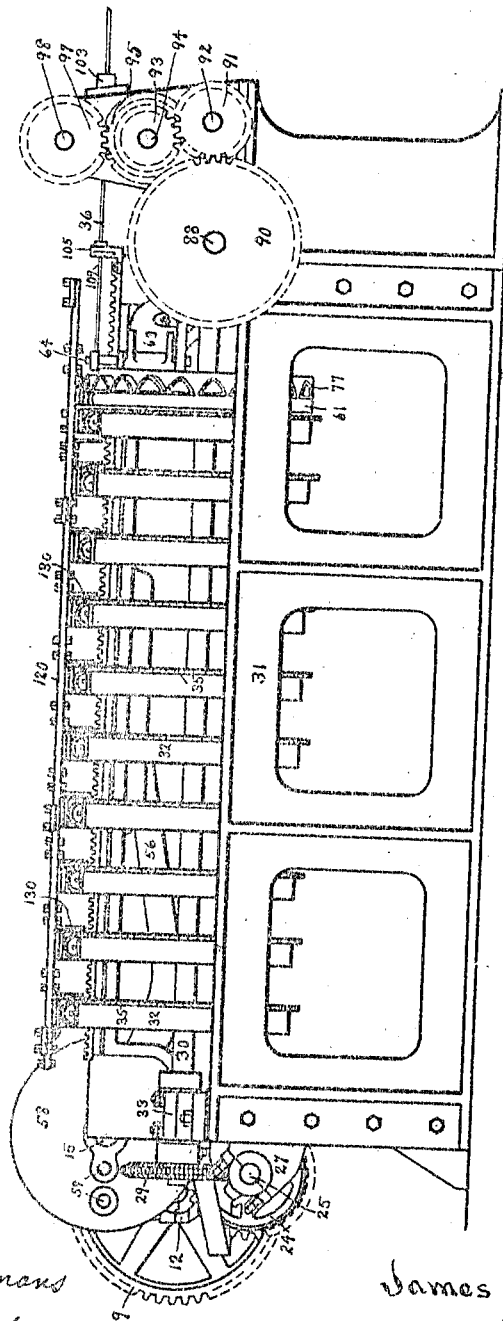
Figure 3:
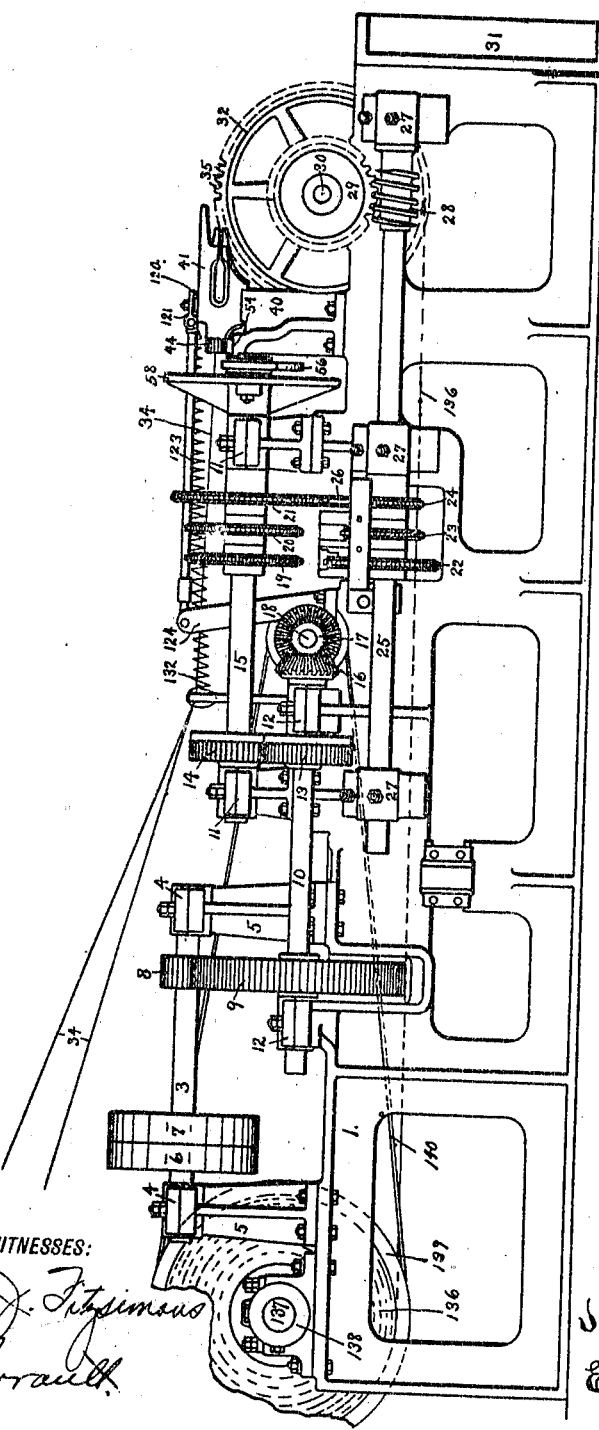
Figure 4:
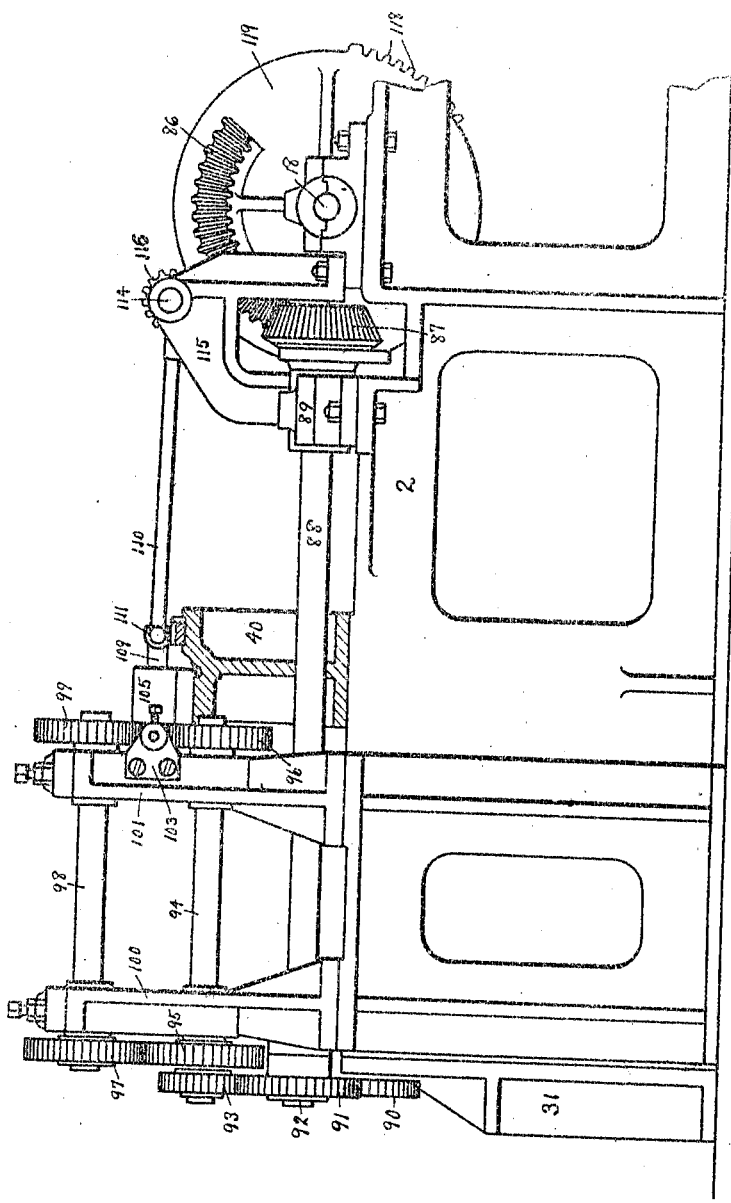
Figure 5:
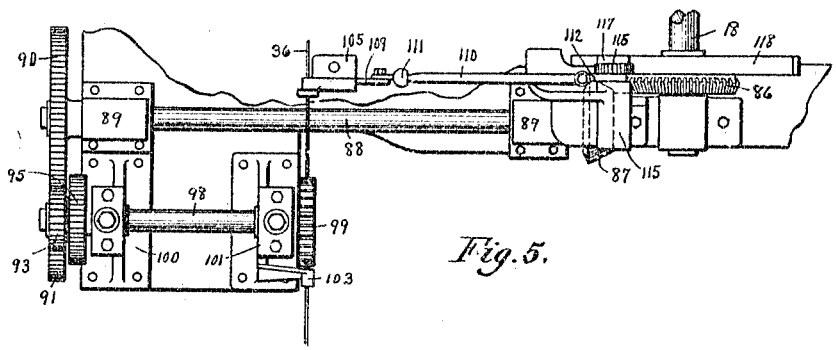
Figure 6:
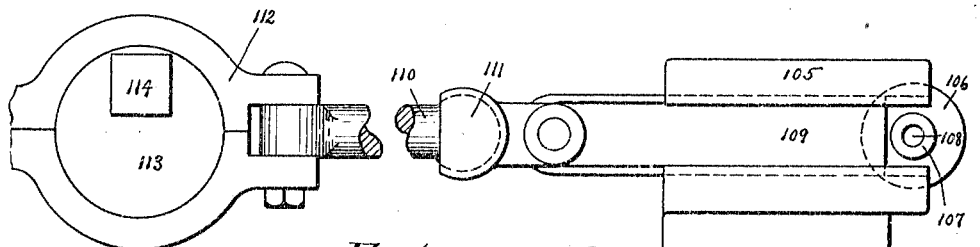
Figure 7:
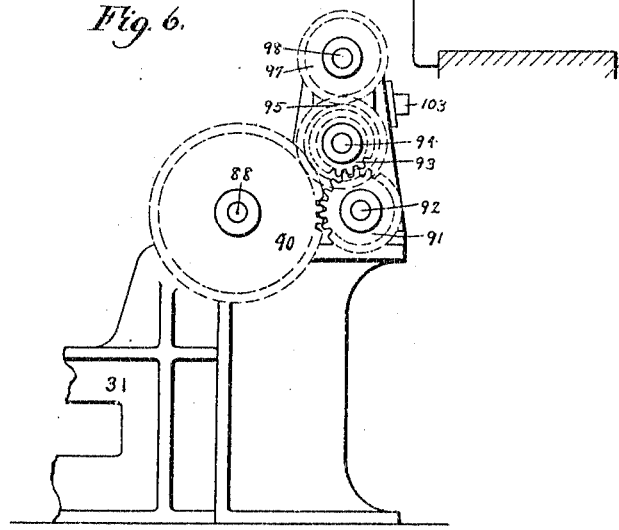
Figure 8:
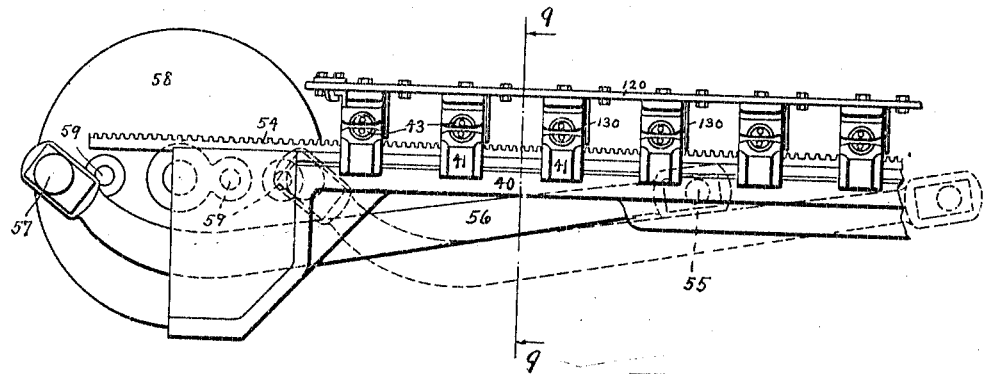
Figure 8:
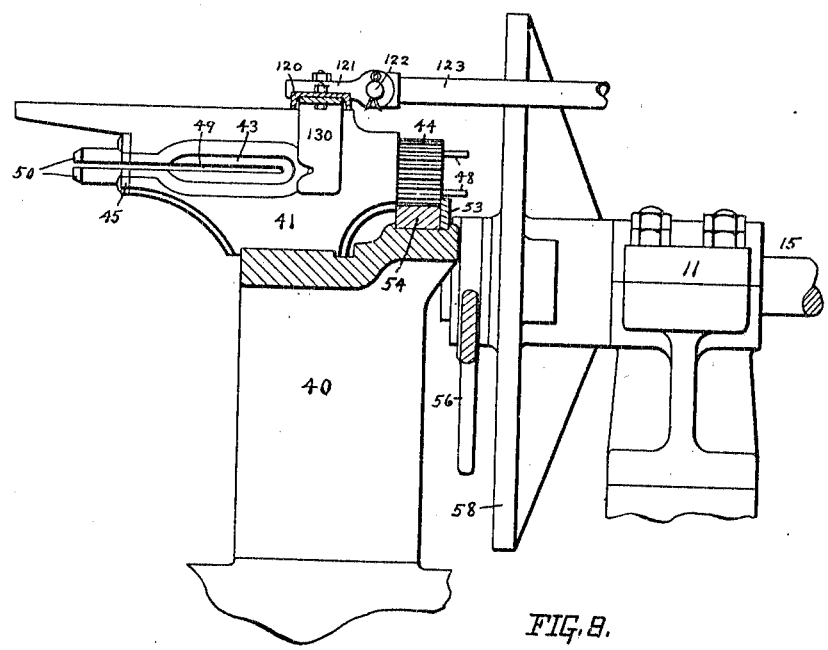
Figure 15:
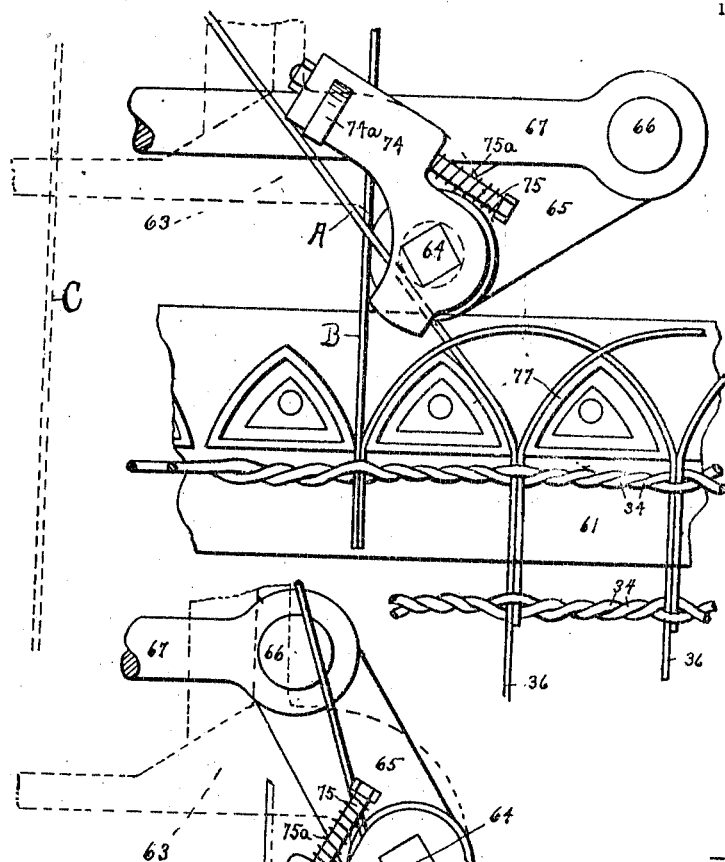
Figure 14:
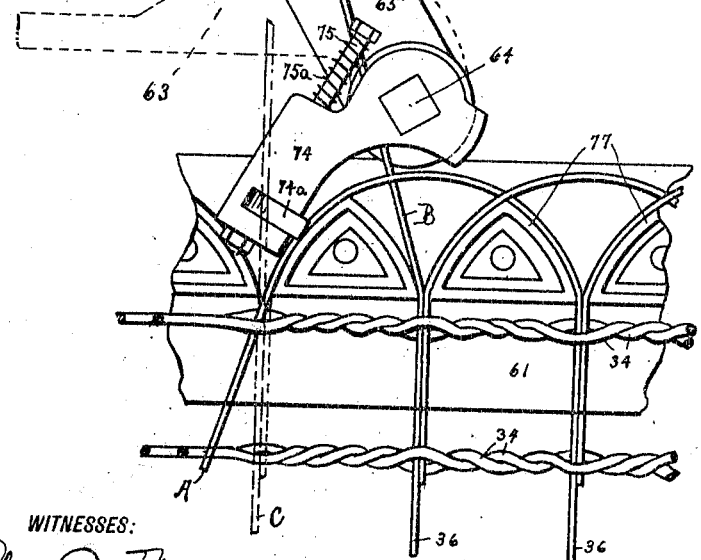
Figure 16:
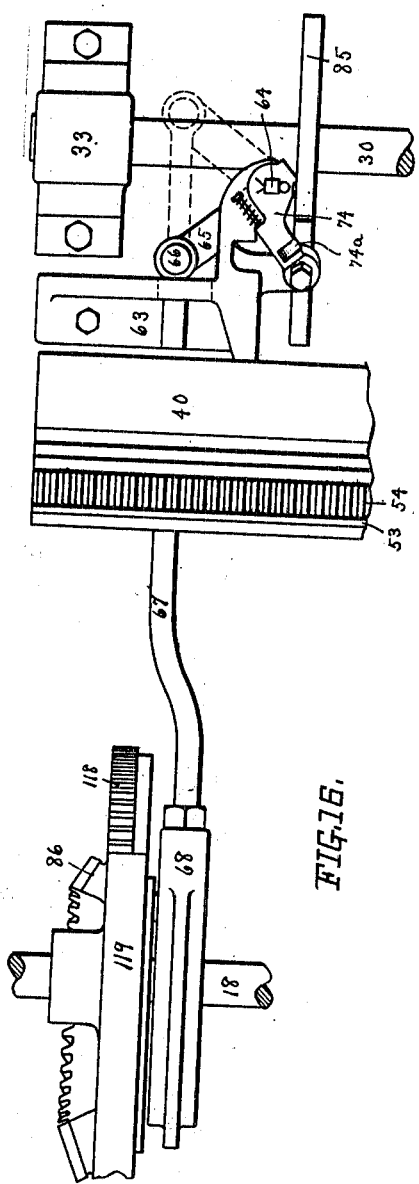
Figure 17:
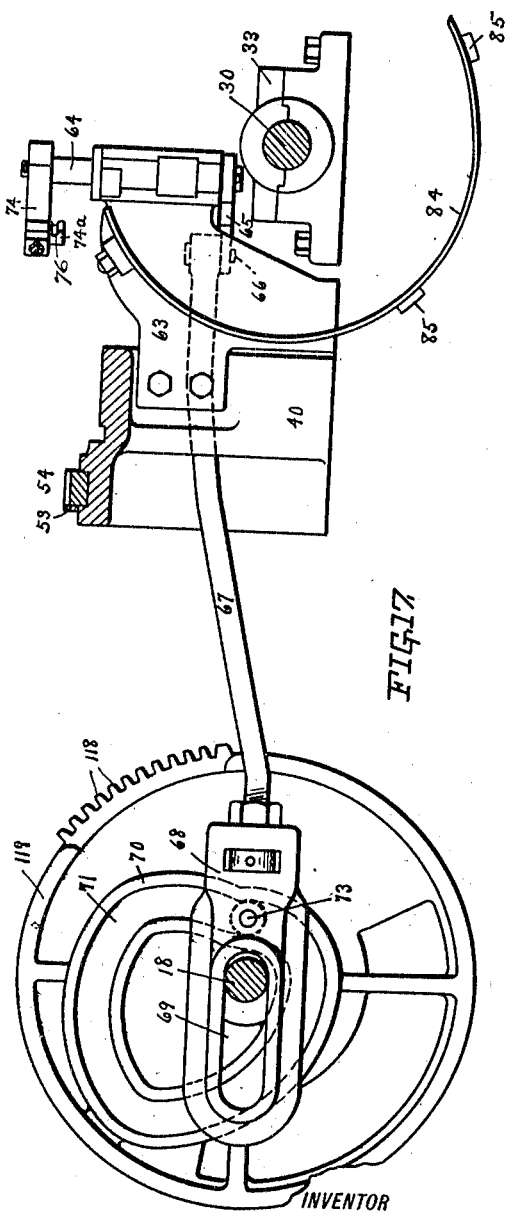
Figure 17:
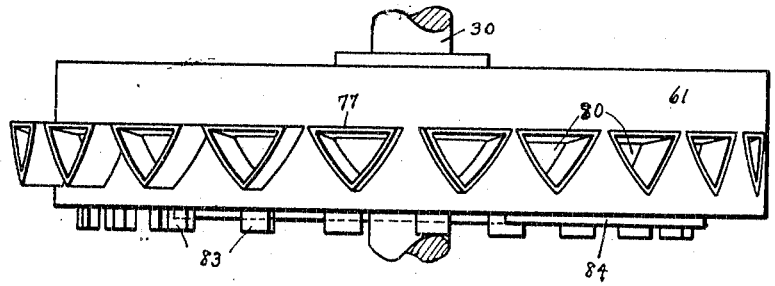
Figure 18:
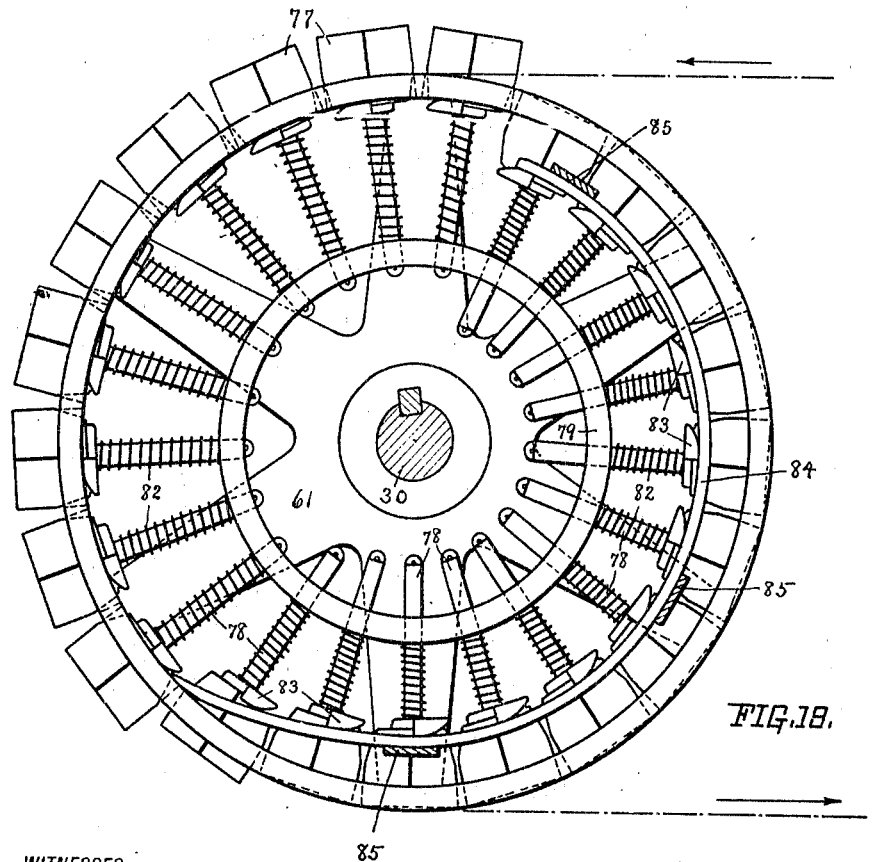
Figure 25:
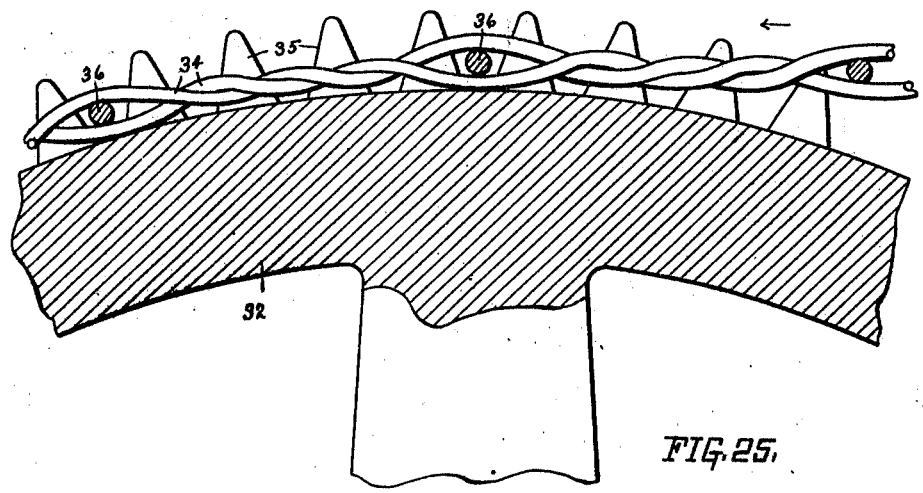
Figure 26:
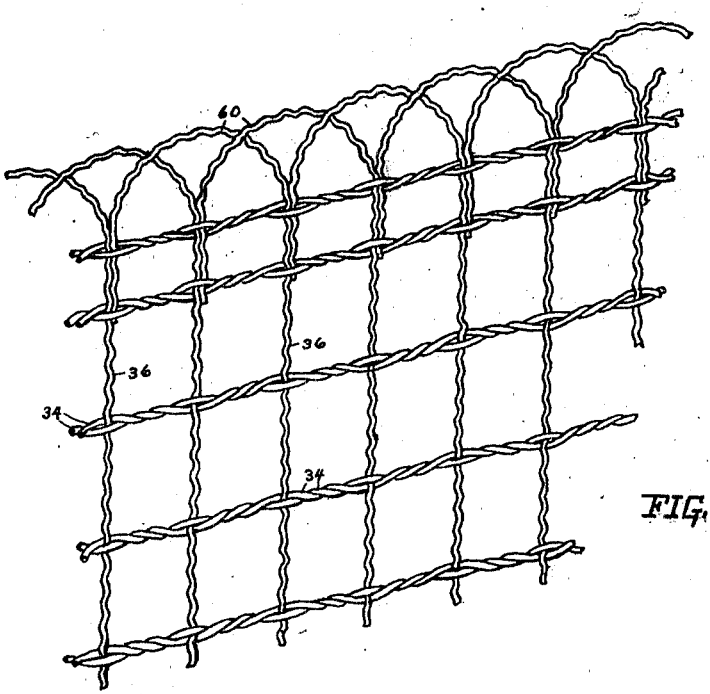

In the accompanying drawings Figure 1 is a plan, Fig. 2 is a front elevation and Fig. 3 is a left side elevation of a machine embodying my invention. Fig. 4 is a side elevation of the woof or picket strand feeding, crimping and cutting mechanism. Fig. 5 is a plan of the same. Fig. 6 is an elevation of the riciprocatory cutter bar of the picket feeding and severing machine, and the actuating parts connected thereto, on a larger scale. Fig. 7 is an end view of the picket feeding, crimping and cutting mechanism. Fig. 8 is a front elevation of the rotary slotted heads for twisting the warp or strand wires, and of the reciprocatory rack for rotating said heads. Fig. 9 is an enlarged transverse section as on line 9—9 of Fig. 8. Fig. 10 is a perspective of one of the said heads, showing a number of picket strands in place between the twisted warp strands, and of the beaters employed to drive the picket strands into position between the warp strands preparatory to the operation of twisting. Figs. 11 and 12 are perspective views of the beaters which are mounted upon the reciprocatory beater bar. Fig. 13 is an enlarged longitudinal section of one of the rotary twisting heads, transversely of the rack and reciprocatory beater bar showing the warp strands passing through said head, and illustrating a portion of the completed fabric at the top of the fence. Fig. 14 is a plan illustrating the completed operation of forming the upper ends of the pickets into arches around the anvils on the rotary drum. Fig. 15 is a similar view showing the beginning of said operation. Fig. 16 is a plan of the mechanism employed for actuating the parts shown in Figs. 14 and 15, which form the tops of the pickets into arches. Fig. 17 is a side elevation of the same. Fig. 18 is a plan of the rotary anvil drum showing the reciprocatory anvils therein. Fig. 19 is an elevation of the same illustrating the means for retracting said anvils. Fig. 20 is a detail of the timing cam and the lever driven thereby for actuating the reciprocatory beater bar. Fig. 21 is a front elevation of the same. Fig. 22 is an elevation of one of the toothed spacing wheels which determine the spaces between the pickets. Fig. 23 is a section transversely of the rim of one of said wheels, on a larger scale, showing a picket lying between the teeth, and a portion of the warp extending across the face of said wheel. Fig. 24 is an edge elevation of said wheel. Fig. 25 is a sectional view as on line 25—25 of Fig. 23. Fig. 26 is a view of a portion of the completed fence or fabric. Fig. 27 is an elevation of the gears which turn the twister heads. Fig. 28 is an edge elevation of the same. Fig. 29 is a view of said gears at the end of a half revolution. Fig. 30 is a perspective of one of the anvils. Fig. 31 is a section of the same. Fig. 32 is a side elevation of the crimping and feeding disks of the picket feeding and cutting machine. Fig. 33 is a sectional view of the pinion and gear for actuating the cutter bar of the picket feeding and cutting machine, on the line 33—33 of Fig. 34. Fig. 34 is a section as on line 34—34 of Fig. 33.

Similar reference characters refer to like parts throughout the several views.

The machine shown in the drawings is made up of side frames 1 and 2 on which is mounted a short driving shaft 3 in the bearings 4, in the upper ends of the pedestals 5, which pedestals rest on the side frame 1 of the machine. On this shaft are the tight pulley 6, the loose pulley 7, and the pinion 8 which meshes with the large gear 9 on the shaft 10. This shaft 10 is mounted in bearings 12 on the side frame 1 and carries the mutilated gear 13, more clearly shown in Fig. 27, which meshes with the companion gear 14 on the shaft 15, and causes this shaft to make one half revolution at each alternate half-revolution of the shaft 10, and to rest between such alternate half-revolutions. The shaft 10 also carries the miter gear 16 which meshes with the miter gear 17 on the cross shaft 18. The shaft 15 is mounted in bearings 11 on the frame 1.

As shown in Figs. 27, 28 and 29, the gear 13 has a segmental flange 13$^a$ which engages the concave ends of the stop-plate 14$^a$ on the gear 14 during one half-revolution of the shaft 10, and prevents the gear 14 from turning. During the other half-revolution of the shaft 10, the teeth of the gear 13 engage one or the other group of teeth of the gear 14 and turn the shaft 15 one half-revolution. The beginning and end of one of these half-revolutions are shown in Figs. 27 and 29 respectively.

The shaft 15 is connected to mechanism for twisting the warp wires employed to form the fabric, and as these wires are twisted in alternate directions between succeeding pickets, the parts are designed so that for one half-revolution of the shaft 15 the twisting will be in one direction, and for the next half-revolution of the shaft, the twisting will be in the opposite direction. During the time occupied by this twisting and the rest following the twisting, the shaft 18 makes one revolution which represents a full cycle of the machine, that is, all the operations necessary to place and secure one picket between the warp wires of the fabric. The distance between the pickets will depend upon the speed at which the warp wires are moved, and gearing is therefore provided for changing the speed of these warp wires.

On the shaft 15 are mounted the gears 19, 20 and 21, which may be of any desired construction and which may connect to the gears 22, 23 and 24 on the shaft 25 in any desired manner. In the present case, these gears are shown to be chain-wheels which connect by means of a chain 26. This shaft 25 is mounted in bearings 27 on the frame 1 and carries a worm 28 at its front end which meshes with the worm-wheel 29 on the transverse drum-shaft 30 at the front end of the machine. This shaft 30 is mounted in bearings 33 on the side frames 1 and 2 and has secured to it the wheels 32 which receive the warp wires 34. Each wheel 32 may have proper teeth 35, as shown in Figs. 22, 23 and 24, between which the pickets 36 extend secured between the wires of the warp strands 34. It will be noticed that each of these warp strands is formed of two wires which rest on the faces of these wheels 32. The spiders and rims of these wheels are secured directly to the shaft 30. See Figs. 22 and 23. To provide for the alinement of the teeth 35, if desired, in order to easily provide straight troughs to receive the picket wires 36, the teeth are preferably independent of the wheels, being formed on rings 37, having slots 38 through which the screws 39 extend to hold the rings 37 in any desired position. The front ends of the side frames 1 and 2 may be connected by means of the cross frame 31.

Extending across the machine from side to side and secured to the frames 1 and 2, is a frame 40 to which are secured a series of twister heads, shown in Figs. 10 and 13. Each head consists of a body 41 secured at the desired position by means of screws 42, and forming a bearing for the spindle 43. Each spindle has a gear 44 at its rear end and is held in position by means of plates 45 and screws 46. Each spindle has longitudinal holes 47 through which the warp wires 34 can pass, and at their rear ends the spindles may be reinforced by means of hardened sleeves 48. Each spindle is provided with a transverse slot 49 through which the picket wires 36 are introduced. The pull on the warp wires 34 is from the right in Fig. 13, which may bend the points 50 of the spindle toward each other. To prevent this, the plates 45 are provided with circular collars 51 which engage in circular grooves formed near the front ends of these spindles. These spindles twist the two wires of each warp strand, first in one direction and then in the other, alternating between successive pickets, and always resume positions of rest with the slots 49 horizontal to permit the introduction of the pickets. The mechanism for the turning of the spindles is as follows: Slidable longitudinally of the frame 40 and transversely of the machine is a rack-bar 54, as shown in Figs. 10 and 13. A plate 53 may be secured to the rear side of this rack-bar to prevent rearward movement of the spindles. Referring now to Fig. 1, it will be seen that this rack-bar is provided with a pin 55 to which a connecting rod 56 is coupled. This rod also couples to a crank pin 57 carried by the crank disk 58 which is mounted on the shaft 15. The details of this construction are more clearly illustrated in Figs. 8 and 9. It will be seen that the number of rotations of the spindles depends upon the length of movement of this rack-bar 54. In order to permit a variation in the number of twists of the warp wires, the disk 58 may be provided with additional holes 59 to receive the crank pin 57, which holes are at different distances from the center of the crank disk. By these means the stroke of the rack-bar 54 may be accurately controlled and varied according to circumstances.

As shown in Fig. 26, the fabric is formed of the woof or picket wires 36 and the warp wires 34. This present machine is designed to not only secure the picket wires in position by twisting the wires of the warp strands alternately in opposite directions, but is also designed to form the ends of the pickets 36 into arches 60 by bending an end of each back so that it will lie along the second following picket and be there retained by the twisting of the warp strands. The mechanism for bending these wires is as follows. See Fig. 1. Secured to the shaft 30 near one end is a drum 61 of substantially the same size as the wheels 32 and provided with a series of radially movable anvils 77, substantially triangular in shape, as shown in Figs. 14, 15 and 30. Mounted on the frame 2 is a bracket 63 which carries a revoluble shaft 64 to which is secured an arm 65, on the outer end of which is a pin 66 which also extends through the outer end of a link 67. See Figs. 14, 15, 16 and 17. This link connects adjustably to a yoke 68 which has a slot 69 through which the shaft 18 extends and by which the yoke is supported. Secured to the shaft 18 is a cam 70 having a groove 71 into which a pin 73 on the yoke 68 extends. At each revolution of this shaft 18, the yoke 68 and the arm 65 will be moved forward and swing the arm 74 on the shaft 64 from the position shown in Fig. 15 to that shown in Fig. 14.

The picket wires 36 are fed in transversely to the machine and longitudinally of the drum shaft and assume a position indicated by the dotted lines C in Fig. 15. The preceding picket B is still straight, while the picket A preceding it has already been bent to an angle of about thirty degrees by its contact with the shaft 64. At the next cycle of the machine, the anvil-carrying drum turns the distance between the wires A and B, while at the same time the arm 74 swings to the position shown in Fig. 14, and a special device moves the picket C from the position indicated in Fig. 15 to that of Fig. 14, and at the same time bends the in-turned end of the picket A to the position indicated by the dotted lines in Fig. 14. Immediately thereafter, the warp wires are twisted to hold the pickets A and C in position, and the arm 74 swings up to the position shown in Fig. 15. As will be noticed in Fig. 14, the picket wires are below the plane of the arm 74. This arm is provided with a downwardly turned finger 74$^a$, secured on a rod 75 on which is a spring 75$^a$ which normally holds the finger 74$^a$ vertical, but will permit the finger to swing up when the arm 74 passes from the position of Fig. 14 to that of Fig. 15, the finger swinging up to pass the picket C. This finger may have a notch 76 (Fig. 17) to prevent the picket wires from bending up or down. As the pickets are moved laterally into position, it is necessary that the anvils 77 around which they are bent shall not be in the path of these wires until such anvils are necessary, that is, until after the wire is moved from the position C in Fig. 15 to that in Fig. 14. Each anvil 77 is mounted on a radial stem 78 passing through the ring 79 and the openings 80 of the face of the anvil-carrier 61, and having springs 82 between the ring 80 and the cam-shoe 83 on each stem 78. A stationary segmental cam 84 is mounted on the frame 40 and connected to the side frame 2 by means of brackets 85. As the anvil carrier revolves, the cam-shoes 83 engage the outer end of this cam 84 and move inward, as shown in Fig. 19, sliding along this cam until the upper end is reached, when the springs 82 will force the anvils upwardly. The cam-shoes 83 engage the rim of the carrier and prevent the anvils from moving out too far. As this anvil carrier is operated by the gears 13 and 14 as before described, the fabric will be stationary one half of the time and be in motion one half the time. Similarly, the twister heads will be stationary for one half the time and revolve during the other half of the time. The parts are so timed that the twisting of the warp wires will occur during the time that the anvil carrying drum is turning, and the twisting will be completed at the time the anvil carrier ceases to turn, both being driven by the shaft 15. The swinging of the arm 74 will be completed just after the anvil carrier has stopped turning, and this arm 74 will remain in the position shown in Fig. 14 until the new woof wire has been placed in position and the twisting has begun. The mechanism for laterally moving the pickets will move with the anvil carrier during such a distance as is necessary to hold the picket C and the end of the arch A in position until the warp wire has been twisted sufficiently to lock them. After the anvil carrier has made a portion of its part-revolution, and after the arm 74 has swung through about one half of the distance between the positions shown in Figs. 15 and 14, the next succeeding anvil escapes from the cam 84 and is forced outward by its spring 82, so that it will be in position to assist in forming the next succeeding arch when the arm 74 has been swung inward at it next operation.

As shown in Fig. 26, the pickets 36 are crimped to insure a more positive engagement between them and the warp wires. The mechanism for crimping, cutting and feeding these woof wires is illustrated in Figs. 1, 2, 4, 5, 6, 7, 32, 33 and 34. The shaft 18 is provided with a mutilated gear 86 (Fig. 16) which meshes with the pinion 87 on the driving shaft 88 of the cutting off mechanism, mounted in the bearings 89 on the frame 2. This shaft 88 carries a main driving pinion 90 which meshes with the pinion 91 on the stub shaft 92, as indicated in Figs. 2 and 4. The pinion 91 meshes with a gear 93 mounted on the shaft 94, which shaft carries the gear 95 and the crimping wheel 96 on its other end. The gear 95 meshes with the gear 97 on the shaft 98, which shaft also carries a crimping gear 99, which crimping gears are shown on a larger scale in Fig. 32. These shafts 94 and 98 are revoluble in bearings in the frames 100 and 101. Mounted on the frame 101 is a guide 103 through which the wire which forms the pickets is drawn by means of the crimping wheels 99 and 96, which have teeth 102 as shown in Fig. 32. These crimping wheels will be actuated once at each cycle of the machine, that is, at each step of the anvil-carrying drum, and the link of wire which is fed through these crimping wheels will depend upon the number of teeth upon the gear 85 on the shaft 18. To sever this wire at proper intervals, a cutting-off mechanism is mounted on the frame 40 consisting of a guide 105 on the end of which is mounted a plate 106 having a hard steel bushing 107 through the bore 108 of which the wire is fed. See Figs. 4 and 6. Slidable in the guide 105 is a cutter bar 109 having a link 110 connected to it by means of a ball-and-socket joint 111, as shown in Fig. 6. The opposite end of this link connects to a strap 112 of the eccentric 113 mounted on the shaft 114, which shaft is revoluble in a frame 115 mounted on the side frame 2, as shown in Fig. 4. Secured to this shaft 114 is a mutilated gear 116 (Fig. 33) provided with a stop plate 117, which teeth mesh with the teeth 118 formed on the plate 119 in contact with the mutilated gear 86, while the stop plate 116 normally rides on the smooth periphery of this plate, and thus prevents the gear 116 from turning until after the picket 36 has been completely fed inward. All this occurs while the twister spindles, the anvil carrier 61 and the wheels 32 are at rest. It will therefore be seen that at each revolution of the shaft 18, the shaft 88 will be revolved in order to feed a proper length of wire through between the crimping wheels 96 and 99 and to crimp the wire, after which it will be cut off, so that it may be employed as the woof of this fabric. The guides 103 and 106 are so positioned that the picket wire will pass through the openings 49 in the spindles 43 on the line D in Fig. 13. This will occur immediately after the twisting operation of the warp wires has been completed, and when the cross-bar 120 is in the position shown in dotted lines in Fig. 13. Immediately after the woof wires have been fed to this position D shown in Fig. 13, they are forced forward to the position C by means of the mechanism termed beaters, which will now be described.

The upper portions of the heads 41, in which the spindles 43 are revolved, are flat, and on them is slidable a cross-bar or beater-bar 120, preferably in the form of a channel. Knuckles 121 connect to this beater-bar 120 and carry pins 122 to which links 123 connect, which links also connect to the upper ends of the levers 124, mounted on the pins 125, extending inwardly from the side frames 1 and 2. These levers 124 are made of two parts spaced apart intermediate the ends to receive rollers 126 mounted on the pins 127, which rollers engage the cams 128 mounted on the shaft 18. Secured to the bottom side of the beater-bar 120 are the beaters 130 and 130ª which may have either one or two downwardly extending arms, as shown in Figs. 11 and 12, depending whether they are to be placed between two of the wheels 33 or on the outer sides of the outer wheels of the group. These beaters have notches 131 to receive the woof wires when said wires are moved from the position D in Fig. 13 to the position C. In order to return this cross-bar, springs 132 may connect to the same and to an arch bar 134 extending across between the frames 1 and 2, as shown in Fig. 1.

The warp wires 34, in pairs, come down from any desired source and pass through the arched guide-bar 134 and then through the holes 47 in the twister spindles 43, and then pass around the wheels 32 on the shaft 30. This shaft, together with the wheels 32, turns intermittently at the same times that the twister spindles turn, the periods of rest between movements being substantially equal to the periods of movement. During the time the spindles 43 are at rest, a picket 36 is crimped and fed through the slots 49 in these spindles and cut off, after which the beaters move this picket forward to proper position almost against the inturned end of the second preceding picket, which end has been bent by means of the arm 74. The completion of the forward movement of the beaters and the completion of the bending movement of the arm 74 coincides with the beginning of the turning movement of the shaft 30 and the wheels thereon, and of the twisting movement of the spindles 43. This results in the pickets being held forward until locked in position by the twisted wires of the warp strands. Step by step, the fabric 136 is built up and passes down and back beneath the mechanism thus far described to the detachable mandrel 137, mounted in bearings 138 on the frames 1 and 2, whereon the fabric will be wound, the mandrel having a pulley 139 on one end which carries a belt 140 that extends around the flanged pulley 141 on the shaft 18. The belt is made sufficiently slack to permit slipping on the pulley 141 as the roll of fabric increases.

It will be understood that while the details of this construction are specified at length, that my invention is not limited thereby, for the proportions and details of the mechanism described may all be changed by those skilled in this art without departing from the spirit of my invention as set forth in the claims. Thus it will be understood that the picket wires may be plain, straight rods or of any desired form and that they may be introduced through the twister heads by hand if desired.

I claim—

1. In a fence machine, the combination of a frame, a shaft mounted at the front end thereof, a series of wheels mounted thereon to receive the warp strands of the fence, and having teeth along their edges between which to receive picket wires, a drum mounted on said shaft and having a series of radial openings in its face, a triangular anvil in each opening, springs to move said anvils outward, a cam to move the anvils inward, twister heads on the frame, a spindle mounted in each head and having longitudinal perforations to permit the passage of warp wires, means to move the picket wires laterally between the warp wires, means to turn the spindles to twist the warp wires after each movement into position of the picket wires, means to turn said wheels and drum one step at each twisting of the warp wires, and means to fold one end of each picket wire around said anvils so its end may be locked in with the second following wire.

2. In a fence machine, the combination of a frame, a shaft mounted at the front end thereof, a series of toothed wheels on said shaft adapted to receive the warp wires and picket wires of the fence, means to feed the picket wires into the machine, a drum having a series of radially slidable anvils, means to move the picket wires laterally to position on the wheels and drum, means to twist the warp wires alternately in opposite directions between succeeding pickets, means to bend the end of each picket back to lie along the second succeeding picket, and means to turn the drum and wheels the angular distance between succeeding anvils at each twisting of the warp wires.

3. In a fence machine, the combination of a frame, a shaft mounted on one end thereof, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend the end of each picket back around two anvils, means to twist the warp wires to lock the previously positioned picket and the bent end of the second picket in advance, and means to turn the drum during such twisting operation.

4. In a fence machine, the combination of a frame, a shaft mounted at the front end thereof, a series of toothed wheels on said shaft adapted to receive the warp wires and picket wires of the fence, means to feed the picket wires into the machine, a drum having a series of anvils, means to move the picket wires laterally to position on the wheels and drum, a series of spindles each having two longitudinal passages for the warp wires, means to turn the spindles in opposite directions and to twist the warp wires between succeeding pickets, means to bend each picket into a semi-circle so that its end lies along the second succeeding picket, and means to turn the drum and wheels the angular distance between succeeding anvils at each twisting of the warp wires.

5. In a fence machine, the combination of a frame, a shaft mounted thereon, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend each picket back around two anvils so that the end will lie along the second succeeding picket, a series of spindles each having two longitudinal passages for the warp wires, a gear on the rear end of each spindle, a rack meshing with said gears, means to reciprocate said rack to turn the spindles in opposite directions to twist the warp wires to lock the previously positioned picket and the bent end of the second picket in advance, and means to turn the drum one step during such twisting operation.

6. In a fence machine, the combination of a frame, a shaft mounted on one end thereof, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend the end of each picket back around two anvils comprising a pivotally mounted arm having a finger to engage the pickets, means to swing said arm to bend the pickets, means to twist the warp wires to lock the previously positioned picket and the bent end of the second picket in advance, and means to turn the drum during such twisting operation.

7. In a fence machine, the combination of a frame, a shaft mounted on one end thereof, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend the end of each picket back around two anvils, a series of spindles having transverse slots to receive the picket wires and longitudinal holes for the passage of the warp wires, means to turn said spindles in opposite directions between adjacent pickets to twist the warp wires to lock the previously positioned picket and the bent end of the second picket in advance, and means to turn the drum during such twisting operation.

8. In a fence machine, the combination of a frame, a shaft mounted at the front end thereof, a series of toothed wheels on said shaft adapted to receive the pairs of warp wires and the picket wires of the fence, means to feed the picket wires into the machine, a drum on said shaft and a series of anvils on the drum, means to move the picket wires laterally between the warp wires of each pair to position on the wheels and drum, means to twist the warp wires of each pair alternately in opposite directions between succeeding pickets, means to bend the end of each picket back around two anvils to lie along the second succeeding picket, and means to turn the drum and wheels the angular distance between succeeding anvils at each twisting of the warp wires.

9. In a fence machine, the combination of a frame, revoluble means on said frame adapted to receive the warp wires and picket wires of the fence, a drum having a series of anvils, means to move the picket wires laterally to position on the drum, a series of spindles each having two longitudinal passages for the warp wires, means to turn the spindles in opposite directions and to twist the warp wires between succeeding pickets, and means to bend a portion of each picket into a semi-circle so that its end lies along the second succeeding picket.

10. In a fence machine, the combination of a frame, intermittently revoluble means mounted on said frame to receive the warp wires and the picket wires of the fence, a drum having a series of anvils, means to move the pickets longitudinally of the warp wires, means to bend each picket back around two anvils so that its end will lie along the second succeeding picket, a series of spindles each having two longitudinal passages for the warp wires, a gear on the rear end of each spindle, a rack meshing with said gears, means to reciprocate said rack to turn the spindles in opposite directions to twist the warp wires to lock the previously positioned picket and the bent end of the second picket in advance, and means to turn the drum one step during such twisting operation.

11. In a fence machine, the combination of a frame, revoluble means mounted thereon and adapted to receive the pairs of warp wires and the picket wires of a fence and including a drum having a series of radially movable anvils, a curved plate to control the position of the anvils, means to crimp, cut off and feed the picket wires into the machine between the warp wires of each pair, means to move the picket wires laterally to proper position, means to bend back the second picket in advance around two anvils until its end lies adjacent the last positioned picket, a series of spindles, each having a pair of longitudinal holes for the passage of the warp wires, and means to turn the spindles in opposite directions between adjacent pickets.

12. In a fence machine, the combination of a frame, revoluble means mounted thereon and adapted to receive the pairs of warp wires and the picket wires of a fence and including a drum having a series of radially movable anvils, a curved plate to control the position of the anvils, means to crimp, cut off and feed the picket wires into the machine between the warp wires of each pair, a laterally movable beater bar and downwardly extending fingers to move the picket wires laterally between the pairs of warp wires to proper position, means to reciprocate the beater bar, means to bend back the second picket in advance around two anvils until its end lies adjacent the last positioned picket, a series of spindles, each having a pair of longitudinal holes for the passage of the warp wires, and means to turn the spindles in opposite directions between adjacent pickets.

13. In a fence machine, the combination of a frame, a shaft mounted thereon, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend the pickets back around the anvils so that their ends will lie along succeeding pickets, a series of spindles each having two longitudinal passages for the warp wires, a gear on each spindle, a rack meshing with said gears, means to reciprocate said rack to turn the spindles in opposite directions to twist the warp wires to lock the previously positioned picket and the bent end of one of the pickets in advance, and means to turn the drum one step during such twisting operation.

14. In a fence machine, the combination of a frame, a shaft mounted on one end thereof, a series of toothed wheels on said shaft adapted to receive the warp wires and the picket wires of the fence, means to feed picket wires to the machine and insert them between the warp wires, a drum on said shaft having a series of anvils, means to move the pickets longitudinally of the warp wires, means to bend the ends of the pickets back around the anvils and comprising a pivotally mounted arm having a finger to engage the pickets, means to swing said arm to bend the pickets, and means to twist the warp wires to lock the previously positioned pickets and the bent ends of the preceding pickets.

15. In a fence machine, the combination of a frame, intermittently revoluble means mounted on the frame to receive the warp wires and picket wires of the fence, means to move the picket wires longitudinally of the warp wires, automatic means to bend the picket wires so that their ends will lie along other picket wires, mechanism for alternately actuating the picket wire moving and bending devices, and means to secure the picket wires to the warp wires.

16. In a fence machine, the combination of a frame, a shaft mounted thereon, a series of toothed wheels and a drum mounted on the shaft, anvils on said drum, said wheels adapted to receive the warp wires and the woof wires of the fence fabric, means to connect the woof wires and warp wires, and a device to bend the ends of the woof wires around the anvils along an edge of the fabric into arches which are secured in position alongside of other woof wires.

17. In a fence machine, the combination of a frame, a shaft mounted thereon, a series of toothed wheels and a drum mounted on the shaft, anvils on said drum, said wheels adapted to receive the warp wires and the woof wires of the fence fabric, means to connect the woof wires and warp wires, a device to bend the ends of the woof wires around the anvils along an edge of the fabric into arches which are secured in position alongside of other woof wires, and automatic means to periodically actuate the bending device.

18. In a fence machine, the combination of a frame, a support mounted thereon to receive the warp wires and the woof wires of the fence fabric, means to connect the warp wires and the woof wires of the fabric, a pivoted arm adjacent an edge of the fabric, a finger carried by said arm to engage the ends of the woof wires and bend them into arches and means to alternately actuate the support for the wires and said pivoted arm.

19. In a fence machine, the combination of a frame, a support mounted thereon to receive the warp wires and the woof wires of the fence fabric, means to connect the warp wires and the woof wires of the fabric, a pivoted arm adjacent an edge of the fabric, a finger carried by said arm to engage the ends of the woof wires and bend them into arches, and means driven by the actuating mechanism of the machine to periodically swing said arm to bend said woof wires.

20. In a fence machine, the combination of a frame, a shaft mounted at the front end thereof, a series of toothed wheels on said shaft adapted to receive the pairs of warp wires and the picket wires of the fence, means to feed the picket wires into the machine, a drum on said shaft and a series of anvils on the drum, means to move the picket wires laterally between the warp wires of each pair to position on the wheels and drum, means to twist the warp wires of each pair alternately in opposite directions between succeeding pickets, means to bend the ends of the pickets back around the anvils to lie along succeeding pickets, and means to turn the drum and wheels the angular distance between succeeding anvils at each twisting of the warp wires.

21. In a fence machine, the combination of a frame, revoluble means on said frame adapted to receive the warp wires and picket wires of the fence, a drum having a series of anvils, means to move the picket wires laterally to position on the drum, a series of spindles each having two longitudinal passages for the warp wires, means to turn the spindles in opposite directions and to twist the warp wires between succeeding pickets, means to bend a portion of each picket into arch form so that its end lies along a succeeding picket, a shaft, and connections between the shaft and the picket moving means and the picket bending means respectively for actuating them alternately.

22. In a fence machine, the combination of a frame, intermittently revoluble means mounted on said frame to receive the warp wires and the picket wires of the fence, a drum having a series of anvils, means to move the pickets longitudinally of the warp wires, means to bend the pickets around the anvils so that the ends will lie along other pickets, a series of spindles each having two longitudinal passages for the warp wires, a gear on the rear end of each spindle, a rack meshing with said gears, means to reciprocate said rack to turn the spindles in opposite directions to twist the warp wires to lock the previously positioned picket and the bent end of another picket in advance, and means to turn the drum one step during such twisting operation.

23. In a fence machine, the combination of a frame, revoluble means mounted thereon and adapted to receive the warp wires and the picket wires of a fence and including a drum having a series of radially movable anvils, a curved plate to control the position of the anvils, means to crimp, cut off and feed the picket wires into the machine between the warp wires, means to move the picket wires laterally to proper position, means to bend the pickets around the anvils until their ends lie adjacent other pickets, a series of spindles, each having longitudinal holes for the passage of the warp wires, and means to turn the spindles in opposite directions.

24. In a fence machine, the combination of a frame, revoluble means mounted thereon and adapted to receive the warp wires and the picket wires of a fence and including a drum having a series of projections, means to crimp, cut off and feed the picket wires into the machine, a laterally movable beater bar and downwardly extending fingers to move the picket wires laterally along the warp wires to proper position, means to reciprocate the beater bar, means to bend the pickets around the projections until their ends lie adjacent other pickets, and means to secure the pickets to the warp wires.

25. In a fence machine, the combination of a frame, a support mounted thereon to receive the warp wires and the woof wires of the fence fabric, means to connect the warp wires and the woof wires of the fabric, a pivoted arm adjacent an edge of the fabric, a finger carried by said arm to engage the ends of the woof wires and bend them into arches, and intermittently actuated means for automatically operating said pivoted arm.

In testimony whereof I have signed this specification in the presence of two subscribing witnesses.

JAMES W. SNEDEKER.

Witnesses:
 HUGO W. KREINBRING,
 EDWARD N. PAGELSEN.